June 28, 1960 G. W. DOYLE 2,942,969
METHOD FOR PRODUCING ZIRCONIUM METAL
Filed July 19, 1956
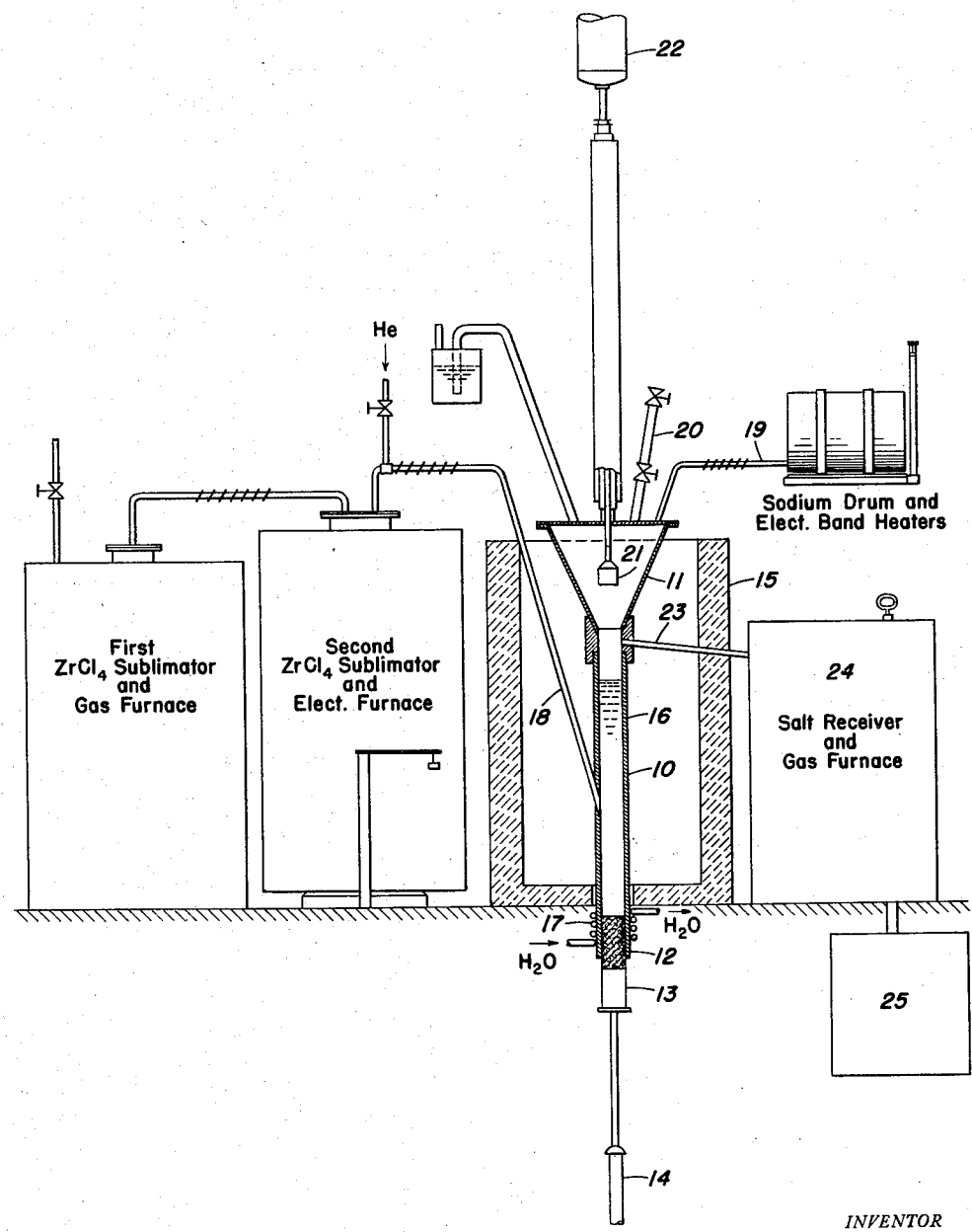
INVENTOR
George W. Doyle
BY *H. L. Gammons*
AGENT

# 2,942,969
METHOD FOR PRODUCING ZIRCONIUM METAL

George W. Doyle, Middletown, N.J., assignor to National Lead Company, New York, N.Y., a corporation of New Jersey Filed July 19, 1956, Ser. No. 598,831

8 Claims. (Cl. 75—84.5)

This invention relates in general to an improved process for producing a refractory metal and more particularly a zirconium metal compact of continuous length by reacting a halide of zirconium with reducing metals in a molten salt bath.

In general, the processes which have heretofore been developed for producing refractory metals by reduction of a halide of the refractory metal with alkali metals and alkaline earth metals including magnesium have been for the most part "batch" type operations, typical of which are those processes described in the Kroll Patent No. 2,205,854, June 25, 1940, and the Schlechten et al. Patent No. 2,482,127, September 20, 1949. It is characteristic of these processes that the refractory metal sponge adheres to the walls of the reaction pot and can be removed therefrom only at great expense, loss of time and impairment of the quality of the metal. Other illustrations of current efforts to produce refractory metal are disclosed in the Maddex Patent No. 2,564,337, August 14, 1951, and the Winter, Jr. Patent No. 2,586,134, February 19, 1952, each of which is directed towards the production of titanium metal in a manner to avoid the distinct disadvantages of a batch-type process.

In all of the aforementioned and similar processes heretofore used, the metal is formed in relatively small batches and by the use of complicated and expensive apparatus, as a consequence of which the production of refractory metals has been slow, laborious and expensive.

A more recent development for producing refractory metals continuously is the ram-type reactor disclosed in the copending applications of Schmidt et al., Serial No. 349,222, filed April 16, 1953, now Patent No. 2,882,143, granted April 4, 1959, and Doyle et al. Serial No. 549,704, filed November 27, 1955, now abandoned, and assigned to the assignee of the instant application. The Schmidt et al. application discloses a process for making refractory metals as for example a titanium metal compact of continuous length by reaction TiCl₄ with a reducing metal in a fused salt bath retained in a reactor characterized by an open bottom end from which the metal compact is expelled; and a ram arranged at the upper end of the reactor adapted both to collect and compact the particles of titanium metal formed in the molten salt bath within the reactor and expel the metal compact from the bath by applying pressure to the compact and forcing it out of the open bottom end of the reactor.

While the process and apparatus of the Schmidt et al. application has proven highly successful for the production of titanium metal compacts suitable for use as consumable electrodes in an arc furnace to form substantially pure titanium metal ingots, it has been discovered that the production of zirconium metal compacts in the ram-type reactor imposes special conditions which do not arise in the production of titanium metal. The above-identified Doyle et al. application describe one adaptation of the ram-type reactor to the production of zirconium metal. Contrary to general belief that zirconium metal may be produced and recovered by processes similar to those used for producing and recovering titanium metal, it has been discovered that the practicability of a process for producing zirconium metal as well as the physical character of the zirconium metal vary depending upon the kinds of metals used in reducing the zirconium metal. It has been discovered that when magnesium alone is used as a reducing metal, the reaction is relatively slow and the utilization of zirconium tetrachloride is fairly low. Moreover, the reaction product produced by reacting magnesium with zirconium tetrachloride comprises a mixture of zirconium metal, magnesium metal and salt having the consistency of mud which is difficult to expel consistently from a ram-type reactor.

Although sodium alone may be used to reduce zirconium tetrachloride and will form zirconium metal of sponge-like quality, nevertheless it has been found that sodium offers a relatively narrow operating temperature range which is delineated by the melting point of sodium chloride (804° C.) and the boiling point of sodium (887° C.); and because the reaction is highly exothermic, about twice that of magnesium and zirconium tetrachloride, even relatively slow reaction rates are prone to create surface temperatures in the bath which exceed the boiling point of sodium. At temperatures above the boiling point of sodium the vent lines of the apparatus are rapidly clogged by vaporized sodium and other reaction products.

However, it has now been discovered that the difficulties atending the use of magnesium or sodium alone as reducing metals may be overcome by feeding a mixture of these two metals into the fused salt and more particularly a mixture in which the two metals are in a predetermined ratio.

In this connection it should be pointed out that an important aspect of the invention is the fact that although the sodium metal reacts almost immediately with any zirconium tetrachloride and/or magnesium chloride to form zirconium and magnesium metals and sodium chloride and hence does not remain in the bath as sodium metal, nevertheless the addition of a mixture of sodium and magnesium metals to the bath in the ratios hereinafter specified is highly important to the success of the process; nor will the addition to the salts of these metals achieve the same results.

While the technical explanation for this phenomenon is not wholly understood, it is positulated that in adding the sodium metal the latter reacts with the zirconium chloride and/or magnesium chloride; and that the magnesium metal formed by the reduction of magnesium chloride by sodium metal has a different form or reactivity than the magnesium metal being added. In any event the addition of sodium and magnesium in the form of metals to the bath has the effect of forming the zirconium metal particles of a character that can be compacted in the bath and extruded therefrom by the ram as a solid compact of zirconium metal.

An object, therefore, of the invention is to provide an improved process for producing refractory metals and in particular zirconium metal.

A further object of the present invention is to produce Zr metal in a fused salt bath in a substantially continuous, direct and economical manner.

Another object of the invention is to produce Zr metal in a fused salt bath in a form such that the particles of Zr metal may be compacted and recovered therefrom as a Zr metal compact of substantially continuous length.

A still further object of the invention is to form a Zr metal billet which may be used as an electrode in an arc furnace to produce a substantially pure Zr metal ingot.

These and other objects of the instant invention will become apparent from the following more complete description and the accompanying drawings in which the figure is a schematic elevation of a ram-type reactor for producing a Zr metal compact by the process of the instant invention.

In its broadest aspects, the present invention relates to an improved process for producing a refractory metal substantially continuously by introducing a halide of the refractory metal into a fused salt bath while feeding a mixture of sodium and magnesium metals into the fused salt bath, thereby to form particles of the refractory metal therein; and periodically consolidating the particles of refractory metal in the bath to form and expel therefrom a refractory metal compact of continuous length.

More specifically, in accordance with the instant invention the substantially continuous production of Zr metal is carried out by providing a bath of molten sodium and molten magnesium chlorides in a reaction chamber having an open bottom end, introducing Zr tetrachloride into the molten salt bath, preferably beneath the surface thereof while feeding a mixture of sodium and magnesium metals in a predetermined ratio into said bath to form particles of Zr metal dispersed throughout the salt bath; and periodically consolidating the Zr metal particles to form a Zr metal compact in the bath which is expelled from the bath and from the bottom end of the vessel as a single integrated Zr metal compact of continuous length. Although the term "refractory metals" has been used in the art to include such metals as titanium, zirconium, vanadium, niobium, tantalum, molybdenum, tungsten, thorium and uranium, in the instant application it is used in a more restricted sense to include zirconium and only those other refractory metals having physical characteristics similar to zirconium.

In one specific embodiment of the invention involving the preparation of substantially pure Zr metal in a ram-type reactor such as illustrated schematically in Fig. 1, a molten salt bath comprising preferably molten sodium chloride and molten magnesium chloride is provided within the reaction vessel which, as shown in Fig. 1, is an open-ended tubular vessel 10 having a short conical section 11 at its upper end and a tail pipe portion 12, sometimes referred to as the expelling section, at its lower end adapted to be closed by a removable closure member or plug 13 which is held in the open bottom end of the reaction chamber 10 by retaining means indicated generally at 14. The reactor is surrounded by a furnace 15 which supplies heat to the reaction chamber for maintaining the salt bath 16 at the proper operating temperature. The expelling section 12 of the reactor is provided with a cooling coil 17 through which a coolant is passed for maintaining this portion of the reactor at a temperature low enough to freeze any molten salt surrounding the compact in this portion of the reactor and thereby seal the bottom end of the latter. The Zr tetrachloride is delivered in the form of a substantially pure gas, from a pair of sublimators, into the lower portion of the reactor 10 by a feed pipe 18. Tapped into the upper end of the feed pipe 18 is a pipe for feeding helium thereto so that a mixture of helium and vaporous zirconium tetrachloride is fed into the molten salt bath. The sodium and magnesium reducing metals are fed into the top of the reactor through suitable feed pipes illustrated generally at 19 and 20 respectively. The ram head 21, used for accumulating and compacting the particles of Zr metal formed in the molten salt bath is carried by a rod supported to reciprocate in the upper end of the reactor and adapted to be actuated by suitable operating means such as a hydraulic cylinder 22 or the like. It will be noted that the Zr tetrachloride feed pipe terminates below the upper surface of the molten salt bath, for it has been found that sub-surface feeding of Zr tetrachloride is preferred so as to insure good contact between the Zr tetrachloride and the reducing metal in the molten salt bath.

It is important, however, that the Zr tetrachloride should be introduced into the bath far enough above the compact level to prevent the Zr metal compact from being attacked by the Zr tetrachloride. The pipe 23 represents the salt removal line which enters the reactor just below the conical enlargement of the reactor, the opposite or lower end of the salt removal line being connected into a salt overflow receiver 24 which, in turn, is connected to a tapping drum 25.

In operating the ram reactor for the production of Zr metal, a displacement-type overflow arrangement is used. By this is meant that the salt bath rises to the level of the salt removal pipe 23 in the reactor only when the ram is immersed in the molten salt bath, the ram head and ram shaft being designed to have sufficient volume to displace more of the molten salt than is formed between successive rammings. By this arrangement the possibility of the constituents of the salt bath overflowing continuously into the salt removal pipe 23 and reacting there with Zr tetrachloride is eliminated. Moreover, by having the salt bath level constantly rising and falling during the operation of the ram, the metal formed is distributed more uniformly throughout the salt bath and hence local overheating is precluded.

The salt bath used in the reactor is composed of halide salts of alkali and alkaline earth metals including magnesium, and while it is possible to use magnesium chloride alone, it is highly desirable to form the bath of a mixture of magnesium chloride and an alkali metal halide such as sodium chloride and to maintain the sodium chloride-magnesium chloride ratio in a range of from about 0.5 to 5.0 parts sodium chloride for each part magnesium chloride, and preferably from 1.3 to 3.5 parts sodium chloride for each part of magnesium chloride. The initial salt bath material is charged into the reactor, and as the reaction progresses, additional salt bath material is formed in the bath by reaction of the halide Zr with the reducing metals which are fed into the reactor by way of the sodium and magnesium feed pipes 19 and 20 respectively.

The salt bath is maintained molten and within the perferred temperature range for the successful production of Zr by any suitable heating means, as for example by burners surrounding the reactor. It has been found that there are three factors which must be taken into consideration as determining the operating temperature of the molten salt bath, namely the melting point of the salt bath mixture, the operating difficulties which are encountered when and if the temperature of the bath exceeds about 875° C., and the melting point of magnesium metal. The extreme temperature limits at which the bath may be used successfully are from 600° C. to 900° C. but it is preferred to operate with a bath within a temperature range of 650° C. to 800° C. As pointed out above, inasmuch as the reaction of sodium metal is highly exothermic and hence causes rapid rises in the temperature of the bath, the lower permissible temperatures of the bath provide better control over sharp bath temperature increases occasioned by the addition of sodium metal. Moreover, the lower permissible operating temperatures of the bath have additional benefits such as, for example, permitting a wider range of construction materials to choose from, a wide choice of reactor design, and a lengthened life expectancy for the reactor.

The rate at which the Zr tetrachloride is fed to the bath depends, in large measure, upon the heat developed in the bath. Experimental work on the scale hereinafter described has demonstrated that Zr tetrachloride may be added to a fused salt bath at feed rates up to 60 pounds per hour with substantially 100% utilization of the Zr tetrachloride. However feed rates greater than 60 pounds per hour would be realized in larger reactors than the experimental one described below.

As hereinafter described, the sodium and magnesium metals are added to the molten salt bath during the operation of the reactor, and experience has shown that while the ratio of sodium to magnesium is a significant factor in the production of a satisfactory type of metal, this ratio may be varied over a sufficiently wide range to give good process control. Ratios of sodium to magnesium below 1.25:1 by weight have been found impractical because of progressivly diminishing zirconium tetrachloride efficiency and the resulting tendency to form a mud-like reaction product. On the other hand, ratios of sodium to magnesium greater than 7:1 by weight display the same disadvantage as pure sodium, namely frequent vent line plugs and relatively violent increases in the temperature of the bath due to the exothermic reaction of sodium. Within the upper and lower limits of these ratios, the mixtures of sodium and magnesium insure salt mixtures that are molten at the desired temperatures of operation, i.e. 600° C. to 900° C. and consequently the reaction temperatures can be maintained just above 600° C., thereby providing good control of the bath temperature. Although the process may be carried out using sodium and magnesium in the ratio of from 1.25 to 7 parts sodium to 1 part magnesium by weight, it is preferred to operate within a range of from 2 to 5 parts sodium to 1 part magnesium by weight. By feeding the reducing metals to the salt bath within the aforesaid feed ratio ranges, the ratio of sodium chloride to magnesium chloride in the bath will be maintained within the ranges hereinabove described.

It has also been established that in order to produce zirconium metal compacts economically and on a commercial scale, it is necessary to maintain an excess of reducing metal in the bath during the reaction for it has been found that a deficiency of reducing metal results in the formation of black, graphite-like reaction product which is apparently a combination of fine zirconium metal and lower chlorides of zirconium, the presence of which in the billet renders it useless for either arc melting or leaching. Such a deficiency of reducing metal results when stoichiometric quantities of each reducing metal are used, for apparently some of the reducing metal will be trapped or in some manner made unavailable for complete reduction of the zirconium tetrachloride. Since sodium reacts with the magnesium chloride of the bath to form magnesium metal and sodium chloride, an excess of sodium cannot exist in the presence of magnesium chloride. Moreover, since the bath composition should be maintained substantially constant, inasmuch as the composition of the bath determines the melting point of the salt bath and indirectly the ease with which the zirconium metal compact may be extruded from the reactor, no excess sodium metal will exist in the bath. However, additions of excess magnesium metal will not affect the bath composition, and consequently excess magnesium may be used within the range of from 0–25% and preferably from 5–10%. Above 25% the magnesium will be interspersed with the particles of zirconium and present relatively difficult problems of compacting, expulsion and ram movement.

Further, in connection with the necessity for maintaining the composition and temperature of the salt bath substantially uniform during the operation of the reactor, it has been found that the sequence by which the reactants are fed to the bath is important. Thus, while zirconium tetrachloride may by charged continuously into the salt bath below the surface thereof during the normal operation of the reactor, it may be desirable, to charge the magnesium and sodium metals intermittently and in small enough unit charges to avoid variations in the composition and temperature of the bath. Factors affecting the allowable size of the magnesium and sodium charges are the volume of the salt bath and the rate of dissipation of heat from the reactor.

The process by which the zirconium metal compact is formed may be described briefly as follows. The reactor is made ready for operation by raising the ram head to its uppermost position in the reactor; the plug retaining means 14 is then adjusted to hold the removable plug 13 firmly in place in the open bottom end of the reactor.

The molten salt bath is prepared by adding sodium chloride and magnesium chloride to the reactor in the weight ratio range described above, and then heating the reactor to melt the salts and establish the temperature in the molten salt bath in the range of from 600°–900° C. and preferably 650°–850° C. After the entire system is purged of oxygen and other deleterious gases, as for example by flooding the system with helium or other suitable gas, a mixture of zirconium tetrachloride and helium is fed into the reactor continuously while magnesium metal and sodium metal in solid and liquid form respectively are fed into the molten salt bath in a sequence such as to maintain the composition of the bath substantially uniform, the ratio of sodium to magnesium being held within the range of from 1.25 to 7 parts sodium to 1 part magnesium, and preferably in the range of 2 to 5 parts sodium to 1 part magnesium, additional magnesium metal being added in an amount such that from 0–25% and preferably from 5–10% excess magnesium is maintained in the bath. The zirconium tetrachloride is introduced into the bath below the surface thereof and is reduced to form particles of zirconium metal therein, a characteristic feature of the invention being that by feeding a mixture of sodium and magnesium into the bath in the ratio above set forth, the zirconium metal formed therein will have an average particle size of from 30–45 microns and will compact in the manner similar to titanium, as a consequence of which it is possible to consolidate the particles of zirconium metal and form a compact of zirconium metal in the lower part of the bath which may be expelled from the bath by means of the ram.

Thus, while feeding the zirconium tetrachloride continuously into the bath, the ram is moved down periodically slowly into the molten salt bath to collect the particles of zirconium metal therein and compress the metal particles against the removable plug. When a substantial quantity of the zirconium metal particles has been collected and the particles compressed in the bottom of the reactor to form a compact of zirconium metal of appreciable thickness, a portion of the compact is expelled from the reactor. As is characteristic of a ram-type operation, as the zirconium metal is compacted, the molten salt retained in the compact is displaced to an appreciable extent from the compact by the compression force of the ram so that when the zirconium metal compact is expelled from the reactor, it is sufficiently free of salts to be used as a consumable electrode in an electric arc furnace for producing a substantially pure zirconium metal ingot.

Turning again to the compact, as it is formed in the expelling section of the reactor adjacent the cooling coil, it will be surrounded by a thin layer or skin comprising substantially molten salt which is retained between the sides of the compact and the adjacent wall of the reactor. This skin of salt, being in the exposed lower end of the reactor and adjacent the cooling coil, will be cooled sufficiently to freeze and thereby form a seal between the compact and the wall of the reactor to preclude leakage of the molten salt therefrom. The frozen salt skin thus serves not only to seal the bottom end of the reactor but also to assist in holding the compact firmly therein. In this connection, however, it should be pointed out that the primary force necessary to support the plug 13 and/or the compact in the lower end of the reactor is provided by the plug supporting means 14 which, during the initial stages of the operation, is raised to its uppermost position to engage and support the removable plug. However, as soon as a compact of substantial thickness has been formed in the reactor, the plug is dispensed with and the compact itself serves as closure means for the open bottom end of the reactor, the holding means 14 then engaging directly against the end of the compact.

Expulsion of a fractional part of the zirconium metal compact from the molten salt bath may be accomplished by either of two techniques, that is to say with each stroke of the ram, or at periodic intervals following successive strokes of the ram. However, irrespective of which technique is used, the force of the ram is used to break the salt seal between the compact and the walls of the chamber and to expel the compact from the molten salt bath. It is clear, therefore, that the ramming action of the ram serves to collect the zirconium metal in the molten salt bath and compress the particles of zirconium metal into the form of a zirconium metal compact; and that with each expelling action of the ram, a fractional portion of the compact already formed in the molten salt bath is forced out or expelled from the bottom end of the reaction vessel. Under properly controlled conditions the reactor may be run uninterruptedly, thereby expelling a zirconium metal compact of continuous length and of high zirconium metal content.

In this regard the zirconium metal compact comprises, in the main, substantially pure zirconium metal and relatively minor amounts of frozen salt which may be separated from the pure zirconium metal by well known leaching and/or distillation techniques. It is also within the purview of the invention to recover substantially pure zirconium metal from the compacted metal by heating the compact to a temperature sufficient to volatilize the salts and melt the zirconium metal. One way this may be done quite effectively is to make the expelled compact, sometimes referred to as a billet, one electrode of an arc furnace. At the temperature of the arc the salts in the billet are volatilized off and the zirconium metal melted to form a substantially pure metal ingot free of salt inclusions.

Although other methods have been employed for preparing zirconium metal, these are notorious for the extreme hazards encountered due to the highly pyrophoric characteristics of the zirconium metal. The hazardous nature of these methods and the high operating costs required to operate them with safety have been major factors in holding back the commercial production of zirconium metal. However, the ram-type process of this invention for producing zirconium metal entails no unusual hazards since the zirconium metal in the form of a compressed billet is not pyrophoric and hence may be handled in the open air under ordinary working conditions with safety and without serious contamination.

*Example I*

A typical continuous run for producing a continuous length of zirconium metal compact was carried out as follows: A mixture of sodium chloride and magnesium chloride weighing about 40 pounds was heated until the salts formed a molten bath, the average salt bath composition being about 69.5% sodium chloride and 30.5% magnesium chloride by weight and the average temperature of the bath being 750° C. At the same time helium gas was fed into the system so as to maintain it free of air, oxygen and the like whereupon one-half pound sticks of magnesium metal, and molten sodium metal were fed into the bath alternately while zirconium tetrachloride was being fed continuously into the bath below the surface thereof at a rate of about 20 pounds per hour. The sodium and magnesium metals were fed into the bath in the ratio of 3.5 parts sodium to 1 part magnesium, additional magnesium being added over and above this ratio such that about 17% excess magnesium was maintained in the bath throughout the run, the total amount of magnesium fed to the bath being 24.75 pounds and the total amount of sodium being 54.5 pounds. During this time substantially 212 pounds of vaporous zirconium tetrachloride was fed into the bath.

The ram was operated periodically to collect and compress the zirconium metal in the bath and form a compact in the bottom thereof which was expelled from the lower end of the reactor in fractional increments as an integrated zirconium metal compact measuring substantially 23⅓ inches in length and having a density of substantially 277 pounds per cubic foot. This zirconium metal compact analyzed as comprising about 84% zirconium metal by weight.

The description above relates particularly to a preferred method and means for forming zirconium metal substantially continually. However, the reactor was run successfully using the so-called batch-type operation wherein a single compact of zirconium metal was formed in the bath and then completely expelled therefrom as an integrated compact. The following example applies to this batch-type run for making a zirconium metal compact.

*Example II*

A mixture of sodium chloride and magnesium chloride weighing about 40 pounds was introduced into the reaction vessel and heated to provide a molten salt bath which was maintained at an average temperature of 720° C. during the run. The average salt bath composition was 68% sodium chloride and 32% magnesium chloride. Helium gas was then fed into the system to maintain it free of air, oxygen or the like whereupon half-pound sticks of magnesium metal and liquid sodium metal were fed alternately into the bath in the ratio of 2.5 parts sodium to 1 part magnesium while zirconium tetrachloride was being fed continuously into the bath below the surface thereof and at the average feed rate of 18 pounds per hour, the rate of feed of the magnesium and sodium metal being such that 24.75 pounds of magnesium and 67.5 pounds of sodium were charged into the bath during the run with 8.3% excess of magnesium in the bath. During this time substantially 315 pounds of vaporous zirconium tetrachloride were charged into the bath, 99.3% of which was utilized in the reaction.

The ram was operated periodically to collect and compress the zirconium metal that was formed in the bath, thereby forming a compact in the lower end of the reactor which was expelled from the reactor at the end of the run. The density of the zirconium metal compact was 305 pounds per cubic foot and analyzed as comprising about 83% zirconium.

The compact was used as a consumable electrode in an electric arc furnace, a current of about 1300 to 1800 amperes at from about 25 to 40 volts being passed through the compact electrode and the second electrode of the furnace to form the high temperature arc. The arc was maintained for a period of about 66 minutes during which time about 14 inches of the compact electrode was melted away, the frozen salts in the compact electrode being volatilized and carried out of the furnace by argon gas which was circulated through the furnace under about 1 pound per square inch pressure. The molten zirconium metal which accumulated in the bottom of the furnace was substantially pure zirconium metal having a hardness of about 115–117 BHN.

From the foregoing description it will be manifest that the process of the instant invention provides a relatively simple, inexpensive and highly productive method for producing zirconium metal of high purity and ductility and which is non-pyrophoric and hence may be readily handled and machined without recourse to special and expensive equipment.

While this invention has been described and illustrated by the examples shown, it is not intended to be strictly limited to the production of zirconium. Thus, it is within the purview of the invention to produce other refractory metals having physical properties similar to zirconium metal; and to employ other variations and modifications within the scope of the following claims.

I claim:
1. A continuous process for producing a zirconium metal compact which comprises providing a reaction bath of molten salts, feeding sodium and magnesium metals into said molten salt bath to provide a mixture of reducing metals in said bath during reaction in a ratio of from 1.25 to 7 parts sodium to 1 part magnesium, feeding zirconium tetrachloride continuously into said molten salt bath and reacting said zirconium tetrachloride with said reducing metal to form particles of zirconium metal in said bath, consolidating the particles of zirconium metal in said bath to produce a relatively dense zirconium metal compact and recovering said zirconium metal compact from said bath by applying pressure thereto and expelling said zirconium metal compact from said bath.

2. A continuous process for producing a zirconium metal compact according to claim 1 wherein the temperature of said molten salt bath is maintained within the range of from 600°–900° C.

3. A continuous process for producing a zirconium metal compact according to claim 1 wherein the temperature of said molten salt bath is maintained within the range of from 650°–800° C.

4. A continuous process for producing a zirconium metal compact according to claim 1 wherein an amount of salt substantially equivalent to the amount formed prior to the consolidation of the particles of zirconium metal is removed from said reaction bath simultaneously with the consolidation of said zirconium metal particles.

5. A continuous process for producing a zirconium metal compact which comprises providing a reaction bath of molten salts, adding sodium and magnesium metals to said molten salt bath to provide a mixture of reducing metals in said bath during reaction in a ratio of from 1.25 to 7 parts sodium to 1 part magnesium, feeding zirconium tetrachloride into said molten salt bath below the surface thereof to react said zirconium tetrachloride with said reducing metals to form particles of zirconium metal in said bath, periodically collecting and compressing the zirconium metal with a compression force sufficient to expel substantially all inclusions of said molten salt from said compressed zirconium metal and form a relatively dense zirconium metal compact in said bath, and recovering said compact of zirconium metal by applying pressure thereto, and expelling the zirconium metal compact from said molten salt bath.

6. A continuous process for producing a zirconium metal billet which comprises providing a reaction bath of molten sodium and magnesium chlorides; feeding sodium and magnesium reducing metals into said molten chloride bath in a predetermined ratio to provide reducing metals in said bath during reaction in a ratio of from 2 to 5 parts sodium to 1 part magnesium and to maintain the said molten sodium and molten magnesium chlorides of said bath in a predetermined ratio, maintaining magnesium metal in said bath in excess of the stoichiometric amount of reducing metal required to reduce said zirconium tetrachloride to zirconium metal, feeding zirconium tetrachloride continuously into said molten chloride bath and reacting said zirconium tetrachloride with said reducing metals to form particles of zirconium metal in said bath, consolidating the particles of zirconium metal in said bath to produce successive compacts of relatively dense zirconium metal, integrating the successively formed compacts, and recovering said integrated compacts as a single zirconium metal billet from said bath by applying pressure thereto, and expelling said zirconium metal billet from said bath.

7. A continuous process for producing a zirconium metal compact according to claim 6 wherein the amount of magnesium metal maintained in said molten salt bath is as high as 25% in excess of the stoichiometric amount of reducing metal required to reduce said zirconium tetrachloride to zirconium metal.

8. A continuous process for producing a zirconium metal compact according to claim 6 wherein the amount of magnesium metal maintained in said molten sodium chloride bath is from 5–10% in excess of the stoichiometric amount of reducing metal required to reduce said zirconium tetrachloride to zirconium metal.

References Cited in the file of this patent

UNITED STATES PATENTS

| | | |
|---|---|---|
| 1,312,262 | King | Aug. 5, 1919 |
| 2,171,439 | Von Zeppelin | Aug. 29, 1939 |
| 2,205,854 | Kroll | June 25, 1940 |
| 2,613,304 | Colinet | Oct. 7, 1952 |
| 2,676,882 | Hatch | Apr. 27, 1954 |
| 2,707,679 | Lilliendahl et al. | May 3, 1955 |
| 2,826,492 | Morash | Mar. 11, 1958 |

FOREIGN PATENTS

| | | |
|---|---|---|
| 152,033 | Australia | June 24, 1953 |